United States Patent
Ewert (10) Patent No.: US 11,731,641 B2
(45) Date of Patent: Aug. 22, 2023

(54) METHOD AND CONTROL UNIT FOR DETERMINING AN EVALUATION ALGORITHM FROM A PLURALITY OF AVAILABLE EVALUATION ALGORITHMS FOR THE PROCESSING OF SENSOR DATA OF A VEHICLE SENSOR OF A VEHICLE

(71) Applicant: Robert Bosch GmbH, Stuttgart (DE)

(72) Inventor: Marlon Ramon Ewert, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 263 days.

(21) Appl. No.: 16/998,445

(22) Filed: Aug. 20, 2020

(65) Prior Publication Data

US 2021/0053581 A1 Feb. 25, 2021

(30) Foreign Application Priority Data

Aug. 22, 2019 (DE) .......................... 102019212604.9

(51) Int. Cl.
*B60W 50/04* (2006.01)
*B60W 50/06* (2006.01)
(Continued)

(52) U.S. Cl.
CPC .......... *B60W 50/045* (2013.01); *B60W 40/04* (2013.01); *B60W 50/06* (2013.01);
(Continued)

(58) Field of Classification Search
CPC .... B60W 50/06; B60W 40/04; B60W 50/045; B60W 2050/0075; B60W 2556/45; G06V 20/56
See application file for complete search history.

(56) References Cited

U.S. PATENT DOCUMENTS

| 9,129,523 B2 * | 9/2015 | Martin ..................... G01S 7/295 |
| 2008/0294315 A1 * | 11/2008 | Breed .................... B60N 2/002 |
| | | 701/49 |

(Continued)

FOREIGN PATENT DOCUMENTS

| DE | 102016205867 A1 | 10/2017 |
| DE | 102017208260 A1 | 11/2017 |

(Continued)

OTHER PUBLICATIONS

Jim McKeeth, "Buffering Sensor Data", podcast from Delphi.org. Jan. 16, 2014 downloaded from delphi.org/2014/01/buffering-sensor-data (Year: 2014).*

(Continued)

*Primary Examiner* — Peter D Nolan
*Assistant Examiner* — Tanya C Sienko
(74) *Attorney, Agent, or Firm* — Norton Rose Fulbright US LLP; Gerard Messina (57) ABSTRACT

A method for determining an evaluation algorithm from a plurality of available evaluation algorithms for the processing of sensor data of a vehicle sensor of a vehicle. The method includes a step of reading in and a step of selecting. In the step of reading in, an environment signal is read in, which represents a current environment parameter acquired by a sensor unit using at least the vehicle sensor and/or received via a communications interface. In the step of selecting, the evaluation algorithm is selected from the plurality of evaluation algorithms for the evaluation of the sensor data of the vehicle sensor using the environment parameter.

10 Claims, 2 Drawing Sheets

(51) Int. Cl.
  *B60W 40/04*  (2006.01)
  *G06V 20/56*  (2022.01)
  *G06V 10/82*  (2022.01)
  *B60W 50/00*  (2006.01)

(52) U.S. Cl.
  CPC .............. *G06V 10/82* (2022.01); *G06V 20/56* (2022.01); *B60W 2050/0075* (2013.01); *B60W 2556/45* (2020.02)

(56) References Cited

U.S. PATENT DOCUMENTS

| | | | |
|---|---|---|---|
| 2014/0065976 A1* | 3/2014 | Jones | H04W 4/027 455/67.11 |
| 2014/0188638 A1* | 7/2014 | Jones | H04W 8/22 705/16 |
| 2016/0014252 A1* | 1/2016 | Biderman | A61G 5/04 701/29.2 |
| 2016/0170089 A1* | 6/2016 | Collins | G01S 7/003 702/5 |
| 2016/0217398 A1* | 7/2016 | Unuma | G06Q 10/06 |
| 2016/0265919 A1* | 9/2016 | Schuller | G01C 21/206 |
| 2016/0358088 A1* | 12/2016 | Lemmer | G06N 7/00 |
| 2017/0061195 A1* | 3/2017 | Li | G01C 21/1656 |
| 2018/0239991 A1* | 8/2018 | Weller | G06F 16/907 |
| 2018/0373992 A1* | 12/2018 | Yin | G06N 5/04 |
| 2019/0255989 A1* | 8/2019 | Rowell | G06V 20/597 |
| 2019/0266779 A1* | 8/2019 | Kulkarni | G06T 15/04 |
| 2019/0303112 A1* | 10/2019 | Rajiv | G06F 8/70 |
| 2020/0168012 A1* | 5/2020 | Boss | G07C 5/008 |
| 2020/0175311 A1* | 6/2020 | Xu | B60D 1/62 |
| 2020/0249936 A1* | 8/2020 | Barfield, Jr. | G06F 8/60 |
| 2020/0396134 A1* | 12/2020 | Jotshi | H04L 41/145 |
| 2021/0166082 A1* | 6/2021 | Ogasawara | G06F 18/285 |
| 2021/0237763 A1* | 8/2021 | Berger | G05D 1/0246 |

FOREIGN PATENT DOCUMENTS

| | | | |
|---|---|---|---|
| DE | 112016004563 T5 | 7/2018 | |
| DE | 102018002514 A1 * | 9/2018 | |
| DE | 102018002514 A1 | 9/2018 | |
| DE | 102017212835 A1 | 1/2019 | |
| WO | WO-2017174228 A1 * | 10/2017 | ............ B60W 30/00 |

OTHER PUBLICATIONS

YouTube video, "3d bounding box estimation for autonomous driving" posted by Liu Zechen Mar. 28, 2019 https://youtu.be/IIReDnbLQAE 0:00-0:54 (Year: 2019).*

Listed as being "by Ivan" in Towards Data Science "Parallel and Distributed genetic algorithms", Mar. 15, 2018 accessed at https://towardsdatascience.com/parallel-and-distributed-genetic-algorithms-1ed2e76866e3 (Year: 2018).*

Y.Zhang and Q. Ji, "Camera Calibration with Genetic Algorithms", Proceedings of the 2001 IEEE International Conference on Robotics & Automation Seoul, Korea—May 21-26, 2001 (Year: 2001).*

Q. Wang, L. Fu, and Z. Liu. "Reviewon Camera Calibration" 2010 Chinese Control and Decision Conference May 26-2, 2010, Pub. IEEE (Year: 2010).*

* cited by examiner

METHOD AND CONTROL UNIT FOR DETERMINING AN EVALUATION ALGORITHM FROM A PLURALITY OF AVAILABLE EVALUATION ALGORITHMS FOR THE PROCESSING OF SENSOR DATA OF A VEHICLE SENSOR OF A VEHICLE

CROSS REFERENCE

The present application claims the benefit under 35 U.S.C. § 119 of German Patent Application No. DE 102019212604.9 filed on Aug. 22, 2019, which is expressly incorporated herein by reference in its entirety.

FIELD

The present invention provides a method and a control unit for determining an evaluation algorithm from a plurality of available evaluation algorithms for the processing of sensor data of a vehicle sensor of a vehicle. A computer program is also provided in accordance with the present invention the present invention.

BACKGROUND INFORMATION

An autonomous vehicle is a vehicle that manages without a driver. The vehicle drives autonomously, for instance by independently detecting the road course, other road users or obstacles and calculating the corresponding control commands in the vehicle and forwarding them to the actuators in the vehicle, leading to a correct influencing of the driving behavior of the vehicle. In the case of a fully autonomous vehicle, the driver does not take part in the driving scenario. Currently available vehicles are not yet able to act in an autonomous manner. One of the reasons is that the corresponding technology has not been fully perfected yet. Another reason is that the current regulations still demand that the vehicle driver himself be able to intervene in the driving scenario at all times. This makes the implementation of autonomous vehicles more difficult. However, systems that represent highly automated driving are already in existence. Therefore, it can already be predicted that fully autonomous vehicle systems will arrive on the market in a few years.

SUMMARY

The present invention provides an improved method for determining an evaluation algorithm from a plurality of available algorithms for the processing of sensor data of a vehicle sensor of a vehicle, and it furthermore provides an improved control unit which uses this method, and finally, a corresponding computer program is provided in accordance with the present invention. The measures described herein allow for advantageous further developments of and improvements in the control unit.

The present invention provides a possibility for processing sensor data in the most optimal manner possible, for instance in order to improve the functionality and to thereby increase the reliability and safety.

In accordance with an example embodiment of the present invention, an method is provided for determining an evaluation algorithm from a plurality of available evaluation algorithms for the processing of sensor data of a vehicle sensor of a vehicle. The method includes a step of reading in and a step of selecting. In the step of reading in, an environment signal is read in, which represents a current environment parameter acquired by a sensor unit using at least the vehicle sensor and, additionally or alternatively, received via a communications interface. In the step of selecting, the evaluation algorithm is selected from the plurality of evaluation algorithms for the evaluation of the sensor data of the vehicle using the environment parameter.

For instance, the present method is able to be used for a vehicle that is developed to transport people and additionally or alternatively, objects. The vehicle can be a highly automated vehicle, for example, which therefore has at least one vehicle sensor. The vehicle sensor is developed so that it is advantageously able to carry out advantageous safety-relevant functions of the vehicle. Accordingly, the vehicle sensor may be realized as an optical sensor, e.g., a camera or a lidar sensor, for instance. Alternatively, the vehicle sensor may also be realized as a radar or an ultrasonic sensor. The sensor data acquired by the vehicle sensor such as image data are able to be processed with the aid of at least one evaluation algorithm from the plurality of evaluation algorithms. This means that every evaluation algorithm includes certain conditions for an evaluation. The at least one evaluation algorithm, for instance, may be realized as a neural network or as an artificial intelligence. For instance, the current environment parameter acquired by the vehicle sensor or obtained via the communications interface may indicate environment information at a point in time in a current position of the vehicle. In an advantageous manner, the safety at least of a passenger of the vehicle is able to be ensured with the aid of the present method.

According to one specific example embodiment of the present invention, in the step of reading in, the environment signal representing the environment parameter is able to be read in, the environment parameter representing a driving parameter, a weather parameter, a traffic parameter and, additionally or alternatively, a sensor-specific environment parameter. For example, the environment parameter may represent a value that may relate to a vehicle velocity or a tire pressure of the vehicle in the form of the driving parameter. The driving parameter may advantageously represent a value of a type that relates to the vehicle and, additionally or alternatively, to a drive of the vehicle. Values relating to an air pressure, an airflow and various weather conditions, for example, may be denoted as weather parameters. This advantageously makes it possible to distinguish between high precipitation weather and nice, sunny weather. The traffic parameter indicates values that represent a traffic density and other data related to traffic, for example. Data preprocessed by other sensors of the vehicle, for instance, may be denoted as sensor-specific environment parameters. In an advantageous manner, the most comprehensive protection of the vehicle and, additionally or alternatively, of vehicle functions is able to be realized as a result.

In the step of selecting, the evaluation algorithm in which at least one environment parameter allocated to the selected evaluation algorithm corresponds to the current environment parameter is able to be selected from the plurality of algorithms. This means, for instance, that a comparison of the current environment parameter with environment parameters stored in the individual evaluation algorithms is performed and the evaluation algorithm is then selected in which, for instance, the stored environment parameter corresponds to the current environment parameter within a tolerance range, such as the current driving parameter, the current weather parameter, the current traffic parameter and additionally or alternatively, the current sensor-specific environment parameter. In an advantageous manner, a precise result that is authentic for a respective situation is then able to be achieved by applying the selected evaluation algorithm.

According to one specific example embodiment of the present invention, in the step of selecting, a second evaluation algorithm for the evaluation of the sensor data of the vehicle sensor is able to be selected from the plurality of evaluation algorithms using the environment signal and, additionally or alternatively, using an evaluation result that represents a result of an application of the selected evaluation algorithm to the sensor data. This means that the second evaluation algorithm as well is selected using the environment parameter, so that the second evaluation algorithm is also able to produce an authentic result. In an advantageous manner, the best possible object detection in an environment of the vehicle is able to be ensured.

According to a further specific example embodiment of the present invention, in the step of selecting, the second evaluation algorithm is able to be selected using other environment parameters of the environment signal than the environment parameters of the environment signal used for the selection of the evaluation algorithm. For example, this means that the evaluation algorithm as well as the second evaluation algorithm are able to be carried out using different environment parameters such as a high or a low speed as the physical variable, and good weather or poor weather so that the result is advantageously not falsified by deviating factors, for example.

In addition, the present method may include a step of applying the evaluation algorithm and the second evaluation algorithm, the evaluation algorithm and the second evaluation algorithm being able to be at least partly executed simultaneously and, additionally or alternatively, sequentially. In other words, both evaluation algorithms may be executed both simultaneously and one after the other. For example, one of the evaluation algorithms is thereby able to be activated or deactivated in the background while the other evaluation algorithm is active in the foreground. This advantageously allows for a dynamic activation and additionally or alternatively, a deactivation.

According to one specific embodiment of the present invention, in the step of applying, evaluation results of an application of the selected evaluation algorithm to the sensor data and second evaluation results of a second evaluation algorithm applied at least partly simultaneously with the selected evaluation algorithm are able to be buffer-stored. In response to a switchover signal, it is possible to switch from an output of the evaluation results to an output of the second evaluation results. This means, for instance, that the evaluation results and the second evaluation results are able to be stored, e.g., in a circular buffer, and, for example, the evaluation results of the respective evaluation algorithm active in the foreground are always stored, even after a switchover of the evaluation algorithms that are active in the foreground. In an advantageous manner, the evaluation results and additionally or alternatively the second evaluation results are able to be utilized for a further application of the evaluation algorithms.

In the step of applying, an evaluation algorithm may be used which was selected using the same environment parameter of the environment signal as the second evaluation algorithm. This advantageously makes it possible to verify an evaluation result.

According to one specific example embodiment of the present invention, in the step of applying, the selected evaluation algorithm and the second evaluation algorithm are able to be fed by the same sensor data. In an advantageous manner, this makes it possible to allocate both evaluation results to a particular point in time, for instance.

According to one specific example embodiment of the present invention, in the step of reading in, at least one of the evaluation algorithms is able to be read in from a vehicle-external device, a Cloud and additionally or alternatively a further vehicle, and in the step of selecting, the at least one selected evaluation algorithm is additionally or alternatively able to be made available to the vehicle-external device, the Cloud and, additionally or alternatively, to the further vehicle. For example, the vehicle-external device may be a vehicle-external computer or a traffic device via which traffic data, for instance, are able to be buffer-stored and forwarded to additional vehicles. As an alternative, the vehicle is able to communicate directly with the further vehicle so that the corresponding data may be forwarded directly. For example, the Cloud may denote a virtual memory space in which the data output by the vehicle are able to be buffer-stored. In an advantageous manner, the traffic safety may be further improved by transmitting the data.

This example method, for example, is able to be implemented in software or hardware or in a mixed form of software and hardware such as in a control unit.

The approach in accordance with the present invention may furthermore provide a control unit, which is developed to carry out, actuate and/or implement the steps of a variant of a method introduced here in corresponding devices. The objective on which the present invention is based is able to be achieved in a rapid and efficient manner also with the aid of this embodiment variant of the present invention in the form of a control unit.

Toward this end, the control unit may have at least one processing unit for processing signals or data, at least one memory unit for storing signals or data, at least one interface with a sensor or an actuator for reading in sensor signals from the sensor or for outputting control signals to the actuator, and/or at least one communications interface for reading in or outputting data, which are embedded in a communications protocol. The processing unit, for instance, may be a signal processor, a microcontroller or the like, the memory unit possibly being a flash memory, an EEPROM or a magnetic memory unit. The communications interface may be developed to read in data or to output data in a wireless and/or wire-conducted manner, and a communications interface, which is able to read in or output line-conducted data, is able to read in these data from a corresponding data transmission line or to output these data to a corresponding data transmission line in an electric or optical manner, for instance.

In this context, a control unit may be understood as an electrical device, which processes sensor signals and outputs control and/or data signals as a function thereof. The control unit may have an interface, which could be developed in hardware and/or software. In a hardware development, the interfaces may be part of what is known as a system ASIC, which includes quite different functions of the control unit. However, it is also possible that the interfaces are autonomous, integrated switching circuits or are at least partly made up of discrete components. In a software development, the interfaces may be software modules, which are provided in a microcontroller in addition to other software modules.

In one advantageous example embodiment of the present invention, the control unit controls a method for determining an evaluation algorithm from a plurality of available evaluation algorithms for the processing of sensor data of a vehicle sensor. For this purpose, the control unit is able to access sensor signals such as an environment signal, which represents a current environment parameter acquired by a sensor unit using at least the vehicle sensor and/or obtained via a communications interface. The actuation is carried out via actuators such as a read-in unit, which is developed to read in the environment signal, and a selection unit, which is developed to select the evaluation algorithm from the plurality of evaluation algorithms with the aid of the environment signal for the evaluation of the sensor data of the vehicle sensor.

Also advantageous in accordance with the present invention is a computer program product or computer program having program code, which may be stored on a machine-readable carrier or memory medium such as a semiconductor memory, a hard disk memory or an optical memory, and is used for carrying out, implementing and/or actuating the steps of the example method as described in one of the afore-described specific example embodiments of the present invention, in particular when the program code or the program is executed on a computer or a control unit.

Exemplary embodiments of the presented invention are shown in the figures and are described in greater detail below.

DETAILED DESCRIPTION OF EXAMPLE EMBODIMENTS

In the description herein of advantageous exemplary embodiments of the present invention, identical or similar reference numerals are used for the elements shown in the various figures that have a similar effect, and a repeated description of these elements is omitted.

Figure 1:
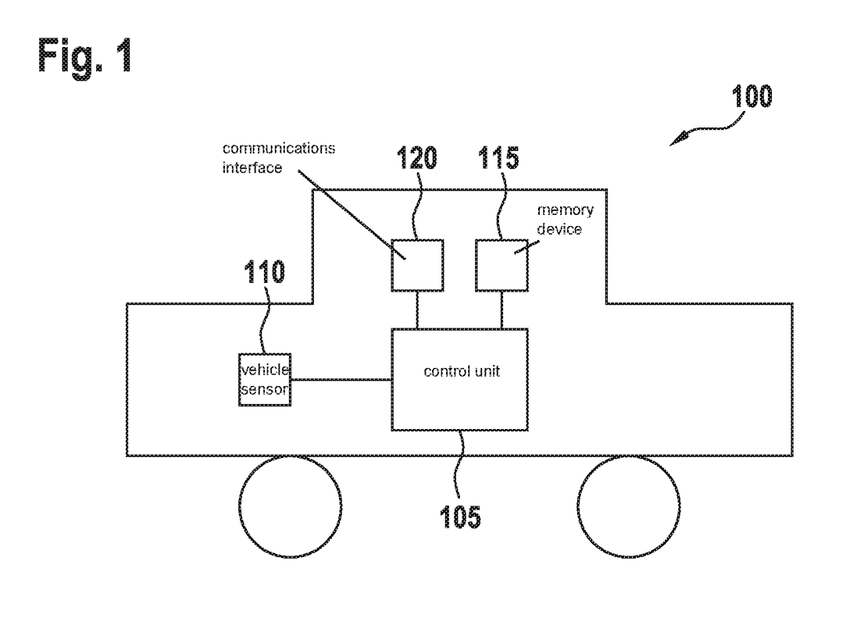
FIG. 1 shows a schematic representation of a vehicle provided with a control unit according to an exemplary embodiment of the present invention.

FIG. 1 shows a schematic representation of a vehicle 100 having a control unit 105 according to an exemplary embodiment. Vehicle 100 is developed to carry persons and/or objects, and in this exemplary embodiment is embodied as a highly automated vehicle 100. According to this exemplary embodiment, control unit 105 is developed to carry out or actuate a method for determining an evaluation algorithm from a plurality of available evaluation algorithms for the processing of sensor data from a vehicle sensor 110 of a vehicle 100. In addition, vehicle 100 has vehicle sensor 110, which according to this exemplary embodiment is part of a sensor unit that may have a multiplicity of sensors such as optical sensors. Moreover, vehicle 100 according to this exemplary embodiment has a memory device 115, which, for instance, is developed to store the plurality of evaluation algorithms. Alternatively, further data such as sensor data acquired by vehicle sensors 110 are able to be stored, which are further processed at a later time, for instance. Memory device 115, for instance, is realizable as a circular buffer which is able to be overwritten. In addition, vehicle 100 has a communications interface 120, which is developed to communicate in a wireless manner with an external device, a Cloud or a further vehicle, for instance. As an alternative, the memory device could also be developed as part of control unit 105 or be integrated therein.

In other words, a multitude of vehicle sensors 110, which may jointly also be called a sensor unit, are used in highly and fully automated vehicles 100, which could also be called autonomous vehicles. For instance, such a vehicle 100 according to this exemplary embodiment is able to communicate via Car-to-X communication with vehicle-external devices or other vehicles, for example. This means that an exchange of information and data takes place between motor vehicles and/or the surrounding infrastructure such as traffic light systems. The goal is to inform a driver of critical and/or dangerous situations in a timely manner. For example, vehicle 100 collects data such as ABS interventions, steering angles, a position, direction and speed and transmits these data via radio such as WLAN or UMTS, e.g., using communications interface 120, to other road users or a traffic infrastructure.

In addition, such a vehicle 100, which is also referred to as a motor vehicle, is equipped with driver assistance systems. Driver assistance systems, for example, are realized as electronic supplementary devices in vehicle 100 for supporting a driver in certain driving situations. In this context, safety aspects but also a greater driving comfort are often in the foreground. Another aspect is an improvement in the economy. Driver assistance systems intervene in a semi-autonomous and/or an autonomous manner in the drive, the control, e.g., the accelerator or the brake, or in signaling devices of vehicle 100 or warn the driver via suitable man-machine interfaces shortly before or during a critical situation. At the present time, most driver assistance systems have been designed so that the responsibility remains with the driver and the driver is therefore not without say. Different types of environment sensors are used for driver assistance systems such as ultrasound (parking aid), radar (lane-change assistant, automatic distance warning), lidar (blind spot monitoring, automatic distance warning, distance control, pre-crash and pre-brake), cameras (lane departure warning, traffic light detection, lane change assistant, blind spot monitoring, emergency brake system for pedestrian protection), and/or GNSS (highly precise vehicle positioning on a map, control of an autonomous vehicle, safe stop). GNSS denotes a global navigation satellite system on the earth and/or in the air using received signals from navigation satellites.

According to this exemplary embodiment of the present invention, vehicle sensors 110 or alternatively also downstream control units have evaluation algorithms for processing data from vehicle sensors 110. For instance, objects around vehicle 100 are detected in the sensor data of vehicle sensors 110 with the aid of neural networks or artificial intelligence (AI). In addition, the sensor data are able to be prefiltered with the aid of corresponding evaluation algorithms, also called algorithms, or be preprocessed for downstream processing. Apart from an object detection, trajectory planning is also carried out in vehicle 100 on the basis of instantaneous, i.e. current environment sensor data, which are also referred to as environment parameters in this context, and the objects detected therein. Such an evaluation algorithm or such an AI may be operative only to a limited extent under certain conditions. For this reason, control unit 105 introduced here is advantageously developed to select an evaluation algorithm from a plurality of evaluation algorithms.

Figure 2:
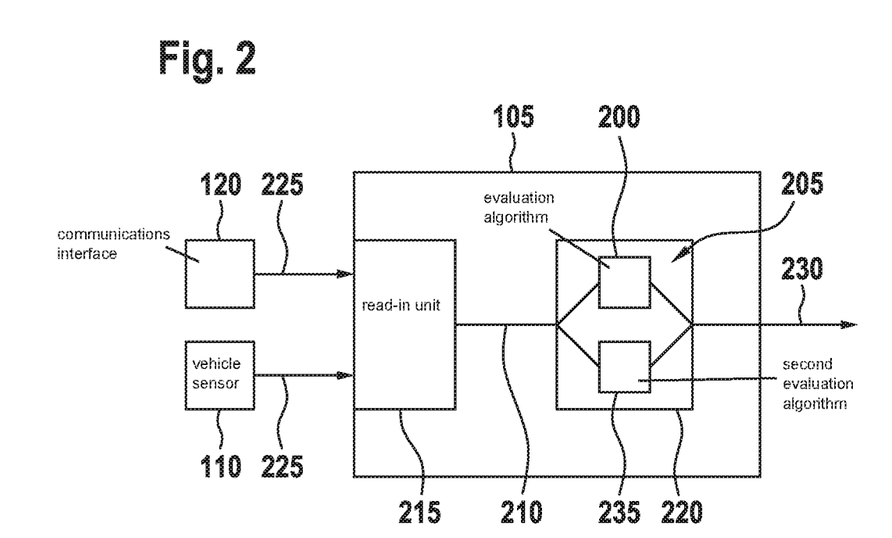
FIG. 2 shows a schematic representation of a control unit according to an exemplary embodiment of the present invention.

FIG. 2 shows a schematic illustration of a control unit 105 according to an exemplary embodiment. This may be control unit 105 described in FIG. 1. For instance, control unit 105 is able to be used in a vehicle as described in FIG. 1. Control unit 105 is developed to carry out the method for determining evaluation algorithm 200 of plurality 205 of available evaluation algorithms for the processing of sensor data 210 of vehicle sensor 110 of a vehicle. For this purpose, control unit 105 has a read-in unit 215 and a selection unit 220. Read-in unit 215 is developed to read in an environment signal 225. Environment signal 225 represents a current environment parameter acquired by the sensor unit using at least one vehicle sensor 110 and/or received via communications interface 120. The environment parameter according to this exemplary embodiment represents a driving parameter, a weather parameter, a traffic parameter and/or a sensor-specific environment parameter. It should be noted that the sensor for sensor data 210 may be a different sensor than a sensor for environment signal 225; however, it is also possible that sensor data 210 and environment signal 225 are supplied by the same sensor.

Selection unit 220 is developed to select evaluation algorithm 200 from plurality 205 of evaluation algorithms in order to be able to carry out an evaluation of sensor data 210 of a vehicle sensor 110 using the environment parameter and to obtain an evaluation result 230 according to this exemplary embodiment. Evaluation result 230 is then able to be used for further processing, for example. In this exemplary embodiment, an environment parameter allocated to selected evaluation algorithm 200 corresponds to the current environment parameter.

In other words, a possibility is introduced for implementing plurality 205 of evaluation algorithms for certain environment parameters. When good weather prevails, for example, a certain evaluation algorithm 200 is used for the evaluation of sensor data 210 of a lidar sensor, or a certain neural network or a certain AI is used for processing precisely these environment sensor data for precisely these weather conditions. With poor weather or snowfall, for instance, a second evaluation algorithm 235 is used for processing sensor data 210 of this vehicle sensor 110 according to this exemplary embodiment. This means that a switchover of different evaluation algorithms 200, 235 takes place based on certain input data such as a weather condition. For instance, this offers the essential advantage that for each weather condition (sun, rain, snow, fog, dust, etc.) or for each further environment condition or input condition that is read in via environment signal 225, different evaluation algorithms 200, 235 are used for processing the data of respective vehicle sensor 110 inside the vehicle. When a change in the environment parameter occurs, which may also be called an input condition, the switchover of the different evaluation algorithms 200, 235 takes place so that the greatest possible performance of vehicle sensor 110 is available inside the vehicle at all times. In this way, the highly automated driving is made safer. According to this exemplary embodiment, the switchover of different evaluation algorithms 200, 235 is implemented with the aid of the input data denoted as environment parameters, which relate to weather conditions, the vehicle speed, the traffic density and sensor-specific environment parameters, for example.

Based on different weather conditions, it may be necessary to switch over to evaluation algorithm 200. For example, under good weather conditions the data of a lidar sensor are evaluated in a different manner than during snowfall or rain. Different evaluation algorithms 200, 235 are stored in control unit 105 for this purpose according to this exemplary embodiment, which are activated or deactivated depending on the individual weather condition.

As an alternative, evaluation algorithms 200, 235 are uniquely set up for different environment parameters. This means that precisely only one evaluation algorithm 200, 235 is ever running in a vehicle sensor 110 or a downstream processing unit (control unit 105) at any given time for a certain weather condition, a certain vehicle speed, a certain traffic density, etc. This means that multiple evaluation algorithms 200, 235 are sequentially operated in vehicle sensor 110 and/or in control unit 105 according to one exemplary embodiment. In this case, evaluation algorithms 200, 235 are devised in such a way that as many environment conditions as possible are covered at the greatest possible performance with the aid of a small number of evaluation algorithms 200, 235. For instance, the environment conditions may correspond to a weather condition algorithm for good weather, a weather condition algorithm for poor weather, a speed algorithm for a low speed, a speed algorithm for a high speed, a weather condition and speed algorithm for good weather and a low speed, a weather condition and speed algorithm for good weather and a high speed, a weather condition and speed algorithm for poor weather and a low speed as well as a weather condition and speed algorithm for poor weather and a high speed. According to this exemplary embodiment, this merely represents a simplified example. Algorithms 200, 235 cover at least one input variable such as the weather condition. Simple switchovers based solely on a weather condition, for instance, are also possible in this specific embodiment, but not combinations of different input data. The number and type of different evaluation algorithms 200, 235 based on the different input conditions may depend on the type of vehicle sensor, for example. For instance, a weather-based switchover of evaluation algorithm 200, 235 is meaningful in a lidar sensor, whereas a switchover based on a traffic density may be meaningful in a radar sensor. A speed-dependent switchover to a camera sensor, for example, may be required in order to detect objects at a satisfactory quality in an image flow at different speeds, for instance because the objects are more distorted at higher speeds.

According to one exemplary embodiment of the present invention, evaluation algorithms 200, 235 are devised for different input data so that they are able to be executed in a cascading manner one after the other. With the aid of example evaluation algorithms 200, 235, for instance, pre-processing of sensor data 210 takes place based on a weather condition, for example, and further processing of sensor data 210, for instance based on a vehicle speed or traffic density, is subsequently carried out with the aid of a downstream evaluation algorithm, which is denoted as second evaluation algorithm 235 according to this exemplary embodiment. In an advantageous manner, the number of stored evaluation algorithms 200, 235 is reduced in this way so that not every single input condition requires a separate algorithm, which in turn saves memory inside the vehicle. An evaluation algorithm 200, 235, also denoted as algorithm, within a cascade is able to generate the best possible output data, or in other words, evaluation results, on the basis of different input data.

For example, according to this exemplary embodiment, an evaluation algorithm 200, 235 for an evaluation of environment sensor data as a function of the vehicle speed is able to be set up, trained or taught with regard to a weather condition with the aid of output data of an upstream algorithm. Based on the respective different evaluation algorithms 200, 235 for weather conditions located in the cascade upstream from this algorithm, the corresponding vehicle speed algorithm may subsequently carry out the further processing of sensor data 210 based on the results of the weather condition algorithms. For instance, this means that the weather condition algorithm is switched over in response to a change in the weather conditions, but not necessarily also the algorithm for the vehicle speed evaluation. This offers the essential advantage that fewer algorithms have to be stored. Pertinent examples according to this exemplary embodiment are the weather condition algorithm for good weather and the vehicle speed algorithm for a low speed, the weather condition algorithm for good weather and the vehicle speed algorithm for a high speed, the weather condition algorithm for poor weather and the vehicle speed algorithm for a high speed as well as the weather condition algorithm for poor weather and the vehicle speed algorithm for a high speed. This is merely a simplified example. The cascade of algorithms includes at least two algorithms for different input conditions and may have any desired length, so that different permutation possibilities result.

According to one exemplary embodiment of the present invention, evaluation algorithm 200, 235 involves an intelligent algorithm such as a neural network or an artificial intelligence (AI). For instance, this intelligent algorithm is taught with the aid of training data for different weather conditions or for different vehicle speeds or, depending on the specific embodiment, by a combination of the respective relevant input data. Next, corresponding algorithms 200, 235 are stored in vehicle sensor 110 and/or in control unit 105 during the production. According to one exemplary embodiment, it is furthermore possible that corresponding algorithms 200, 235 are learned in a Cloud and are then transmitted via a Car-to-X communications link to the corresponding vehicles and their vehicle sensors 110 and/or control units 105.

Alternatively or additionally to the scenario shown in FIG. 2, evaluation algorithm 200 or plurality 205 of evaluation algorithms may also be situated or stored in one of vehicle sensors 110 and need not be integrated into a separate control unit. In this case, for instance, control unit 105 may be understood as part of one of vehicle sensors 110. It is also possible that only one or multiple evaluation algorithm(s) 200 is/are stored in one or more of vehicle sensor(s) 110 and then "reloaded" during a corresponding selection by the (e.g., separate) control unit 105. In this way, for instance, it would also be possible to provide a different algorithm for each corresponding sensor type, which is then used by a (for instance central) control unit 105.

Alternatively or additionally, evaluation algorithm 200 is also able to be read in via communications interface 120. This communications interface 120, which, for instance, may be realized as a mobile radio connection such as a UMTS, EDGE, LTE, 5G connection, a WLAN or Bluetooth connection or the like, may then make it possible for control unit 105 to load one or more evaluation algorithm(s) 200 from a central server or a Cloud and to use it/them accordingly in control unit 105. Such an exemplary embodiment then offers the advantage of a rapid configurability of the supplied evaluation algorithms so that, for instance, an adaptation or optimization of evaluation algorithms 200 is still able to be performed also after control device 105 or vehicle sensors 110 has/have left the factory. As a matter of principle, a selection of the evaluation algorithm may also take place in a central server such as a Cloud. For this purpose, environment signal 225, for instance, should then be transmitted to this central server or the Cloud (e.g., also using communications interface 120) so that the required information or the available evaluation algorithms is/are available in the Cloud or the central server in order to select the most advantageous or most suitable evaluation algorithm. It is therefore obvious that the presented approach is not only able to be executed in a unit of vehicle 100, but that the method introduced here is implementable in any position inside or outside the vehicle. It is therefore possible to realize an exemplary embodiment in which the relevant or selected evaluation algorithm 200 is loaded from a set of evaluation algorithms located in the Cloud and is subsequently run in selection unit 220, or the selection unit is realized in the Cloud and the loading and the operating of the selected algorithm then takes place in control unit 105.

Figure 3:
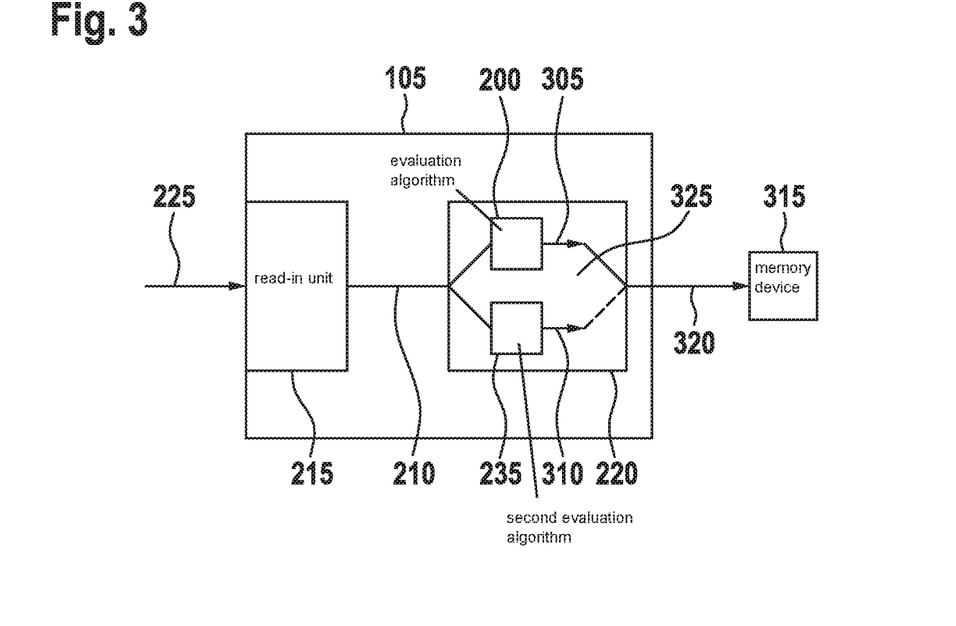
FIG. 3 shows a schematic representation of a control unit according to an exemplary embodiment of the present invention.

FIG. 3 shows a schematic illustration of a control unit 105 according to an exemplary embodiment of the present invention. Control unit 105 shown there may be an alternative exemplary embodiment to control unit 105 described in FIG. 2 and is realizable for a vehicle as described in FIG. 1. Similar to control unit 105 described in FIG. 2, control unit 105 according to this exemplary embodiment has read-in unit 215 and also selection unit 220. Here, too, read-in unit 215 is developed to read in environment signal 225. Selection unit 220 is developed to select evaluation algorithm 200. In addition, selection unit 220 according to this exemplary embodiment is developed to select second evaluation algorithm 235 for the evaluation of sensor data 210 using environment signal 225, or in other words, for instance, to make the selection using the same environment parameters of environment signal 225 or using other environment parameters of environment signal 225 than the environment parameters used for the selection of evaluation algorithm 200, and/or—according to this exemplary embodiment—using an evaluation result 305. According to this exemplary embodiment, evaluation algorithm 200 and second evaluation algorithm 235 are able to be at least partly carried out simultaneously and/or sequentially.

Evaluation result 305, for instance, represents a result of an application of selected evaluation algorithm 200 to sensor data 210. A second evaluation result 310, for example, represents a second result of an application of selected second evaluation algorithm 235 to sensor data 210. According to this exemplary embodiment, evaluation result 305 and second evaluation result 310 are buffer-stored, e.g., in a memory device 315 with the aid of a memory signal 320 after a switch from an output of evaluation result 305 to an output of second evaluation results 310 or from an output of second evaluation result 310 to an output of evaluation result 305 has taken place according to this exemplary embodiment in response to a switchover signal 325. Memory device 315 is realized or is able to be realized as a circular buffer, for instance.

In other words, according to this exemplary embodiment, the corresponding input data for a switchover of stored evaluation algorithms 200, 235 are read in from control unit 105 and corresponding evaluation algorithm 200, 235 is then enabled or started. For example, this may take place in a dynamic manner while the vehicle is driving. For instance, certain sensor data 210 of a vehicle sensor are written into memory device 315, e.g., a circular buffer, for this purpose and evaluated for an input condition with the aid of active evaluation algorithm 200. Second evaluation algorithm 235, to which a switch is to be made in the near future, is already started and/or operated in the background, likewise using buffer-stored sensor data 210. Next, the still active algorithm 200 is deactivated, and second algorithm 235, which has settled by this time, is switched to active, in such a way that only the data of connected second algorithm 235 are used for the driving from this point on, while the data of deactivated evaluation algorithm 200 are no longer utilized. The calculations based on deactivated evaluation algorithm 200 are interrupted and the circular buffer is evaluated using only second algorithm 235. In this way the switchover of evaluation algorithms 200, 235 takes place in a safe way in that both algorithms 200, 235 are initially calculated in parallel and first algorithm 200 is interrupted only after a settled-in state of second algorithm 235 has come about. The weather data, for example, are optionally ascertained by a vehicle-external weather server or ascertained based on a current vehicle position in a Cloud and transmitted to the vehicle, for instance via a Car-to-X communications link. According to one exemplary embodiment, for example, the current vehicle speed is ascertained with the aid of a GNSS-based sensor in the vehicle or with the aid of wheel speed sensor data. According to one exemplary embodiment, a traffic density is optionally also received from a Cloud, for example, which receives the corresponding vehicle positions in a certain region over time and combines them into traffic density information. Moreover, according to one exemplary embodiment, the traffic density is determined with the aid of environment sensors installed in the vehicle and an object detection.

Figure 4:
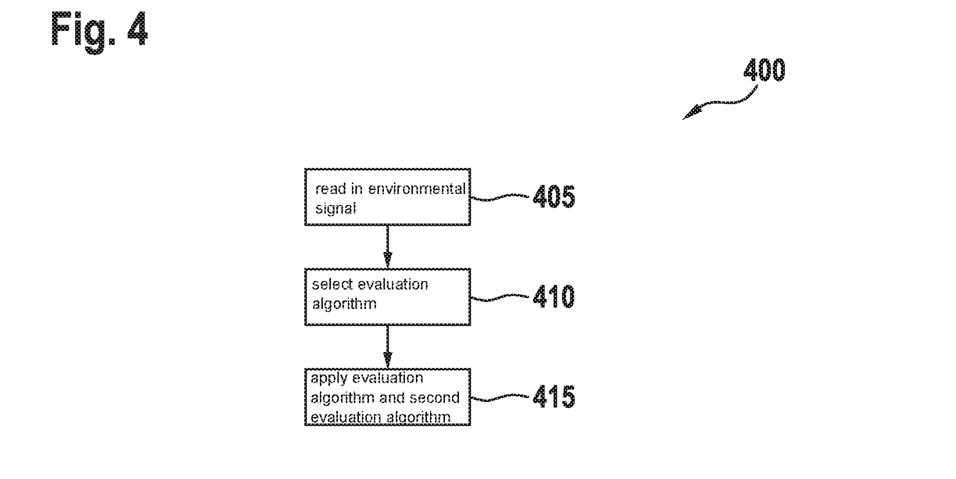
FIG. 4 shows a flow diagram of a method for determining an evaluation algorithm from a plurality of available evaluation algorithms according to an exemplary embodiment of the present invention.

FIG. 4 shows a flow diagram of a method 400 for determining an evaluation algorithm from a plurality of available evaluation algorithms according to one exemplary embodiment of the present invention. According to this exemplary embodiment, described method 400 is able to be carried out by a control unit as was described in FIGS. 1 to 3. Method 400 includes a step 405 of reading in an environment signal, which represents a current environment parameter acquired by a sensor unit having at least the vehicle sensor and/or received via a communications interface. In addition, method 400 includes a step 410 of selecting the evaluation algorithm from the plurality of evaluation algorithms for the evaluation of the sensor data of the vehicle sensor using the environment parameter. Optionally, at least one of the evaluation algorithms is read in from a vehicle-external device, a Cloud and/or a further vehicle in step 405 of reading in, and/or in step 410 of selecting, the at least one selected evaluation algorithm is supplied to the vehicle-external device, the Cloud, and/or the further vehicle.

In addition, method 400 according to this exemplary embodiment includes a step 415 of applying the evaluation algorithm and the second evaluation algorithm, the evaluation algorithm and the second evaluation algorithm being at least partly carried out simultaneously and/or sequentially. In step 415 of applying, an evaluation algorithm is applied, which was selected using the same environment parameters of the environment signal as the second evaluation algorithm. According to this exemplary embodiment, the selected evaluation algorithm and the second evaluation algorithm are optionally fed by the same sensor data.

If an exemplary embodiment includes an "and/or" linkage between a first feature and a second feature, then this should be understood to indicate that the exemplary embodiment according to one embodiment includes both the first feature and the second feature, and according to a further embodiment, includes either only the first feature or only the second feature.

What is claimed is:

1. A method for determining an evaluation algorithm from a plurality of available evaluation algorithms for processing of sensor data of a vehicle sensor of an autonomous vehicle, the method comprising:
   reading in an environment signal which represents a current environment parameter: (i) acquired by a sensor unit using at least the vehicle sensor, and/or (ii) received via a communications interface; and
   selecting the evaluation algorithm, in which at least one environment parameter allocated to the selected evaluation algorithm corresponds to the current environment parameter, from the plurality of available evaluation algorithms for evaluating the sensor data of the vehicle using the current environment parameter;
   wherein in the step of selecting, a second evaluation algorithm for the evaluation of the sensor data of the vehicle sensor is selected from the plurality of available evaluation algorithms: (i) using the environment signal and/or (ii) using an evaluation result that represents a result of an application of the selected evaluation algorithm to the sensor data,
   wherein the vehicle sensor is part of a sensor unit that having a multiplicity of sensors,
   wherein the vehicle has a memory device to store the plurality of evaluation algorithms,
   wherein the vehicle has a communications interface to communicate wirelessly with an external device, an internet database or Cloud, and/or a further vehicle,
   wherein each of the plurality of evaluation algorithms corresponds to a specific environment parameter, so that the one of the plurality of evaluation algorithms is selected when it corresponds to the specific environment parameter,
   wherein a switchover of different ones of the evaluation algorithms occurs based on changed weather conditions and/or other changed conditions, and
   wherein when a change in the environment parameter occurs, the switchover of the different ones of the evaluation algorithms takes place so that the greatest possible performance of the vehicle sensor is available inside the vehicle at all times, and wherein the switchover of the different ones of the evaluation algorithms is implemented with the aid of the environment parameters, which relate to a weather condition and a sensor-specific environment parameter, and at least one of a vehicle speed and a traffic density.

2. The method as recited in claim 1, wherein in the step of reading in, the environment signal representing the current environment parameter is read in, the current environment parameter representing a driving parameter, and/or a weather parameter, and/or a traffic parameter, and/or the sensor-specific environment parameter.

3. The method as recited in claim 1, wherein in the step of selecting, the second evaluation algorithm is selected using other environment parameters of the environment signal than the current environment parameter of the environment signal used for the selection of the evaluation algorithm.

4. The method as recited in claim 1, further comprising:
   applying the evaluation algorithm and the second evaluation algorithm, the evaluation algorithm and the second evaluation algorithm being at least partly carried out simultaneously and/or sequentially.

5. The method as recited in claim 4, wherein in the step of applying, evaluation results of an application of the selected evaluation algorithm to the sensor data and second evaluation results of a second evaluation algorithm applied at least partly simultaneously with the selected evaluation algorithm are buffer-stored, and a switch from an output of the evaluation results to an output of the second evaluation results takes place in response to a switchover signal.

6. The method as recited in claim 5, wherein in the step of applying, an evaluation algorithm is applied, wherein the selected evaluation algorithm is selected using the same environment parameters of the environment signal as the second evaluation algorithm.

7. The method as recited in claim 5, wherein in the step of applying, the selected evaluation algorithm and the second evaluation algorithm are fed the same sensor data.

8. The method as recited in claim 1, wherein: (i) in the step of reading in, at least one of the evaluation algorithms is read in from a vehicle-external device, and/or a Cloud, and/or a further vehicle via the communications interface, and/or (ii) in the step of selecting, the selected evaluation algorithm is made available, via the communications interface, by the vehicle-external device, and/or the Cloud, and/or the further vehicle via the communications interface.

9. A control apparatus, comprising:
a control unit to determine an evaluation algorithm from a plurality of available evaluation algorithms for processing of sensor data of a vehicle sensor of a vehicle, by performing the following:
reading in an environment signal which represents a current environment parameter: (i) acquired by a sensor unit using at least the vehicle sensor, and/or (ii) received via a communications interface; and
selecting the evaluation algorithm from the plurality of available evaluation algorithms for evaluating the sensor data of the vehicle using the current environment parameter;
wherein in the step of selecting, a second evaluation algorithm for the evaluation of the sensor data of the vehicle sensor is selected from the plurality of available evaluation algorithms: (i) using the environment signal and/or (ii) using an evaluation result that represents a result of an application of the selected evaluation algorithm to the sensor data,
wherein the vehicle sensor is part of a sensor unit that having a multiplicity of sensors,
wherein the vehicle has a memory device to store the plurality of evaluation algorithms,
wherein the vehicle has a communications interface to communicate wirelessly with an external device, an internet database or Cloud, and/or a further vehicle,
wherein each of the plurality of evaluation algorithms corresponds to a specific environment parameter, so that the one of the plurality of evaluation algorithms is selected when it corresponds to the specific environment parameter,
wherein a switchover of different ones of the evaluation algorithms occurs based on changed weather conditions and/or other changed conditions, and
wherein when a change in the environment parameter occurs, the switchover of the different ones of the evaluation algorithms takes place so that the greatest possible performance of the vehicle sensor is available inside the vehicle at all times, and wherein the switchover of the different ones of the evaluation algorithms is implemented with the aid of the environment parameters, which relate to a weather condition and a sensor-specific environment parameter, and at least one of a vehicle speed and a traffic density.

10. A non-transitory machine-readable memory medium, on which is stored a computer program, which is executable by a processor, comprising:
a program code arrangement having program code for determining an evaluation algorithm from a plurality of available evaluation algorithms for processing of sensor data of a vehicle sensor of a vehicle, by performing the following:
reading in an environment signal which represents a current environment parameter: (i) acquired by a sensor unit using at least the vehicle sensor, and/or (ii) received via a communications interface; and
selecting the evaluation algorithm from the plurality of available evaluation algorithms for evaluating the sensor data of the vehicle using the current environment parameter;
wherein in the step of selecting, a second evaluation algorithm for the evaluation of the sensor data of the vehicle sensor is selected from the plurality of available evaluation algorithms: (i) using the environment signal and/or (ii) using an evaluation result that represents a result of an application of the selected evaluation algorithm to the sensor data,
wherein the vehicle sensor is part of a sensor unit that having a multiplicity of sensors,
wherein the vehicle has a memory device to store the plurality of evaluation algorithms,
wherein the vehicle has a communications interface to communicate wirelessly with an external device, an internet database or Cloud, and/or a further vehicle,
wherein each of the plurality of evaluation algorithms corresponds to a specific environment parameter, so that the one of the plurality of evaluation algorithms is selected when it corresponds to the specific environment parameter,
wherein a switchover of different ones of the evaluation algorithms occurs based on changed weather conditions and/or other changed conditions, and
wherein when a change in the environment parameter occurs, the switchover of the different ones of the evaluation algorithms takes place so that the greatest possible performance of the vehicle sensor is available inside the vehicle at all times, and wherein the switchover of the different ones of the evaluation algorithms is implemented with the aid of the environment parameters, which relate to a weather condition and a sensor-specific environment parameter, and at least one of a vehicle speed and a traffic density.

* * * * *